Jan. 8, 1946.   J. T. BARRON   2,392,719
CLUTCH
Filed July 19, 1944
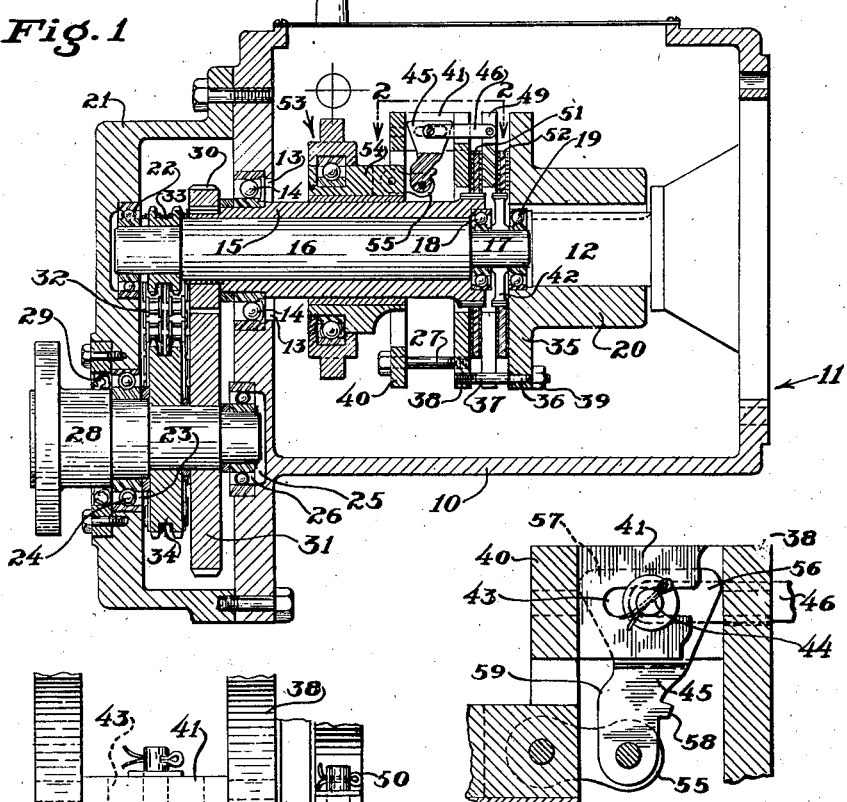
Fig. 1
Fig. 3
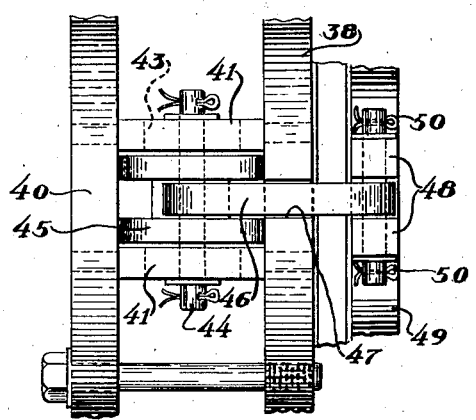
Fig. 2
INVENTOR.
JOHN T. BARRON
BY
Spear, Rawlings & Spear
ATTORNEYS Patented Jan. 8, 1946

2,392,719

UNITED STATES PATENT OFFICE 2,392,719

CLUTCH

John T. Barron, Boston, Mass., assignor to Kinney Manufacturing Company, Jamaica Plain, Mass., a corporation of Massachusetts Application July 19, 1944, Serial No. 545,639

13 Claims. (Cl. 192—48)

My present invention relates to a clutch which functions to couple either of two shafts to another shaft in devices in which the two shafts are driven in opposite directions or in the same direction but at different speeds.

In such devices, the problem is to provide an efficient, easily operated clutch of a simple and durable construction to couple the shafts. Various structures have been proposed and some of these have merited considerable success but have lacked the simplicity of construction that makes both for economy in manufacture and efficiency in service and unlimited possibilities of speed ratios.

In accordance with my invention, I provide the end portions of each of the two concentric driven shafts with a slidable clutch element. The drive shaft, axially alined with the driven shafts, carries a cage which receives the ends of the driven shafts and has a pair of reaction surfaces and a pair of backing surfaces between which the clutch elements are located. The clutch elements of each shaft are separated from each other by a clamping plate slidably supported by the cage. Carried by the clamping plate are a plurality of arms, each of which is pivotally connected to a cam slidably supported between the pair of reaction surfaces. The shifter mechanism includes an axially shiftable sleeve to which and to the cams, links are pivotally connected. Each of the cams has a pair of contact portions engageable with the reaction surfaces and adapted to slide therealong when the shifter sleeve is actuated to rock the cams. When the shifter sleeve is neutrally positioned, each of the contact portions of each cam are spaced substantially equi-distant from the axis of the shafts. Each contact portion is adapted to slide, when the shifter sleeve is moved in either direction from its neutral position, between positions nearer to or further away from the axis of the shafts than are the axes on which the cams pivot to define operative and inoperative positions. When the cams are rocked to effect such operative positions of either contact portion of each cam, the clamping member is actuated to clamp the clutch element of one of the driven shafts against one of the backing surfaces.

I also provide means to relieve the shifting mechanism from clutch coupling pressures when the cams are operatively positioned to couple the drive shaft to either of the driven shafts.

In the accompanying drawing, I have shown my invention as embodied in a reversing unit to illustrate these and other novel features of my invention.

In the drawing:

Fig. 1 is a partly sectioned view of a reversing unit in accordance with my invention.

Fig. 2 is an enlarged fragmentary view along the lines 2—2 of Fig. 1, and

Fig. 3 is an enlarged fragmentary side view of the actuating means.

In Fig. 1, I have shown a casing 10 formed as at 11 to receive the driving element 12. Axially alined therewith is a port 13 which receives ball bearings 14 supporting a hollow driven shaft 15 adjacent one of its ends. A second driven shaft 16 extends through the driven shaft 15 and has an end portion 17 of reduced diameter which carries ball bearing units 18 and 19. The shaft 15 and the flanged hub 20, splined to the driving element 12, are formed to receive the units 18 and 19 thereby to provide support for the front end of the shafts 15 and 16 respectively. A housing 21 bolted to the rear end of the casing 10 has a recess alined with the port 13 for a ball bearing unit 22 which supports the rear end of the driven shaft 16. The housing 21 has a port 23 for a ball bearing unit 24 alined with a recess 25 in the casing 10 in which is mounted a ball bearing unit 26 providing anti-friction supports respectively for the output shaft 28. Shaft sealing means are indicated at 29.

Within the housing 21, I mount a gear 30 on the driven shaft 15 meshing with a gear 31 fast on the output shaft 28 to rotate the shaft 28 in one direction when the shafts 15 and 12 are connected. The shaft 16 is connected to the shaft 28 to cause reverse drive of the shaft 28 when the shafts 16 and 12 are coupled. This may be effected by means of a chain 32 trained over sprockets 33 and 34 fast on the shafts 16 and 28 respectively within the housing 21.

The flange 35 of the hub 20 is bored adjacent its periphery to receive the reduced threaded ends 36 of bolts 37 threaded into the plate 38 to provide means for adjusting the plate 38 relative to the flange 35 to which the bolts 37 are anchored by nuts 39. A ring 40 is clamped in spaced relation to the plate 38 by a plurality of pairs of spacer blocks 41 and cap screws 27 threaded into the plate 38.

The spacer blocks 41 are slotted as at 43 to receive pivot pins 44 for cams 45, shown as arranged in pairs, and for the ends of arms 46 extending through recesses 47 in the periphery of the plate 38 and fastened to pairs of ears 48 with which the periphery of the clamping plate 49 is formed.

On each side of the ears, the periphery of the clamping plate 49 is recessed as at 50 to facilitate the connection of the arms 46 to the ears 48.

The hub 20, the plate 38, the ring 40, and the means connecting these elements together in spaced relation constitute a cage overlying the ends of the shafts 15 and 16. The clamping plate 49 may be slidably supported between the flange 35 and the plate 38 by one or more of the cage forming elements and is shown as being slidably supported by the bolts 37.

Adjacent faces of the flange 35 and the plate 38 constitute backing surfaces and between these surfaces and separated from each other by the clamping plate 49 are clutch elements 51 and 52 slidably supported by the end of the shaft 15 and by the gear 42 fast on the reduced portion 17 of the shaft 16 respectively.

At 53, I have indicated generally shifting mechanism comprising a shifter sleeve 54 slidable on the shaft 15. Links 55 pivotally connected to the cams 45 and to the sleeve 54 provide means for rocking the cams 45.

Each cam 45 has portions 56 and 57 adapted to engage with and slide along the reaction surfaces defined by adjacent faces of the plate 38 and the ring 40. When the shifter sleeve 54 is neutrally positioned, the portions 56 and 57 are spaced equi-distant from the axis of the shafts and are adapted to move, when rocked, between positions nearer to or more remote from the axis of the shafts than the radial distance from the axis of the shafts to the axis on which the cams 45 pivot.

By this construction, when the shifter sleeve 54 is moved in either direction from its neutral position, the cams 45 are rocked so that one of the contact portions 56, 57 slides along one of the reaction surfaces from its inoperative to its operative position to cause the clamping member 49 to clamp one of the clutch elements 51, 52, against one of the backing surfaces to couple one of the shafts 15, 16 to the driving element 12.

In accordance with my invention, I also provide means to relieve the shifting mechanism 53 from clutch coupling pressures when the cams 45 are in either operative position. This may be accomplished as shown in the drawing by forming each cam with portions 58 and 59 disposed to engage respectively with the member 38 or the ring 40 when the cam portions 56 or 57 are in their operative positions.

In accordance with my invention, I am thus able to provide a simple and positively acting clutch for use in such devices as the reversing unit described. Because of the simplicity of construction, economy in manufacture and long and efficient service are ensured.

What I therefore claim and desire to secure by Letters Patent is:

1. A clutch for a unit having a pair of concentric driven shafts and a driving element axially alined therewith, said clutch comprising a cage carried by said driving element to overlie the end portions of said driven shafts, said cage comprising a plurality of interconnected members spaced from each other to establish a pair of backing surfaces, and a pair of reaction surfaces, a clamping member slidably supported by said cage between said backing surfaces, a plurality of cams engageable with said reaction surfaces, axially slidable means pivotally supporting said cams between said reaction surfaces, and links carried by said clamping plate pivotally connected to said axially slidable means, clutch means slidably supported by each of said driven shafts between said backing surfaces and separated by said clamping member, and shifting mechanism including a shifter sleeve slidably supported by one of said driven shafts and links pivotally connected to each of said cams and to said sleeve to rock said cams on actuation of said sleeve in either direction to cause said clamping plate to clamp one of said clutch means against one of said backing surfaces.

2. The clutch of claim 1 in which the cage comprises a flanged hub keyed to the driving element, an annular member anchored to the flange of the hub, and a ring bolted to the annular member.

3. The clutch of claim 1 in which the cage comprises a flanged hub keyed to the driving element, an annular member adjustably anchored to the flange of the hub in spaced relation thereto, and a ring attached to and spaced from the annular member and from the driven shafts to accommodate the shifter mechanism.

4. The clutch of claim 1 in which the cage comprises three members connected to each other in axially spaced relation, adjacent faces of adjacent members constituting pairs of reaction and backing surfaces.

5. A clutch for a unit having a pair of concentric driven shafts and a driving element axially alined therewith, said clutch comprising a cage carried by said driving element to overlie the end portions of said driven shafts, said cage comprising a plurality of annular members and connecting members axially spacing said annular members to establish a pair of backing surfaces, and a pair of reaction surfaces, a clamping member slidably supported between said backing surfaces by at least one of said cage establishing members, a plurality of cams engageable with said reaction surfaces, axially slidable means pivotally supporting said cams between said reaction surfaces, arms carried by said clamping plate pivotally connected to said axially slidable means, clutch means slidably supported by each of said driven shafts between said backing surfaces and separated by said clamping member, and shifter mechanism including an axially shiftable sleeve, and links pivotally connected to each of said cams and to said sleeve to rock said cams on actuation of said sleeve in either direction to cause said clamping plate to clamp one of said clutch means against one of said backing surfaces.

6. The clutch of claim 5 in which each cam has contact portions for sliding engagement with each reaction surface, the contact portions are spaced substantially equi-distant from the axis of the shafts by the shifter sleeve when in its neutral position and, when the cams are rocked by movement of the shifter sleeve in either direction, the contact portions move between positions radially nearer or remote from the axis of the shafts than the distance between the axis of the shafts and the axis on which each cam pivots to establish operative and inoperative positions.

7. The clutch of claim 5 in which each cam has contact portions for sliding engagement with each reaction surface, the contact portions are spaced substantially equi-distant from the axis of the shafts by the shifter sleeve when in its neutral position, and the pivot center of each cam is radially nearer the shaft axis than the contact points and, when the cams are rocked by movement of the shifter sleeve in either direction, the contact portions move between positions radially nearer or remote from the axis of the shafts than the distance between the axis of the shafts and the axis on which each cam pivots to establish operative and inoperative positions, and stop means engageable by the cams and operative to relieve the shifter mechanism from clutch coupling pressures which urge the cams to continue to rock when either contact portion is in its operative position.

8. The clutch of claim 5 in which each cam has contact portions for sliding engagement with each reaction surface, the contact portions are spaced substantially equi-distant from the axis of the shafts by the shifter sleeve when in its neutral position and the pivot center of each cam is radially nearer the shaft axis than the contact points and, when the cams are rocked by movement of the shifter sleeve in either direction, the contact portions move between positions radially nearer or remote from the axis of the shafts than the distance between the axis of the shafts and the axis on which each cam pivots to establish operative and inoperative positions, and stop means engageable by the cams and operative to relieve the shifter mechanism from clutch coupling pressures when either contact portion is in its operative position, and each cam is formed so that when one contact portion is in its operative position, the other contact portion is in its inoperative position.

9. The clutch of claim 5 in which each cam has contact portions for sliding engagement with each reaction surface, the contact portions are spaced substantially equi-distant from the axis of the shafts by the shifter sleeve when in its neutral position and the pivot center of each cam is radially nearer the shaft axis than the contact points and, when the cams are rocked by movement of the shifter sleeve in either direction, the contact portions move between positions radially nearer or remote from the axis of the shafts than the distance between the axis of the shafts and the axis on which each cam pivots to establish operative and inoperative positions, and each cam is formed so that when one contact portion is in its operative position, the other contact portion is in its inoperative postion and each cam has portions engageable with the members establishing the reaction surfaces to relieve the sleeve from clutch coupling pressures when either contact portion is in its operative position.

10. A clutch for a unit having a pair of concentric driven shafts and a driving element axially alined therewith, said clutch comprising a cage carried by said driving element to overlie the end portions of said driven shafts, said cage comprising a plurality of interconnected members spaced from each other to establish a pair of backing surfaces, and a pair of reaction surfaces, a clamping member slidably supported by said cage between said backing surfaces, a plurality of cams engageable with said reaction surfaces, axially slidable means pivotally supporting said cams between said reaction surfaces and means to limit the rocking of said cams between predetermined operative and inoperative positions, and links connecting each of said cams to said clamping plate, clutch means slidably supported by each of said driven shafts between said backing surfaces and separated by said clamping member, and shifting mechanism including a shifter sleeve slidably supported by one of said driven shafts, links pivotally connected to each of said cams and to said sleeve to rock said cams on actuation of said sleeve in either direction to cause said clamping plate to clamp one of said clutch means against one of said backing surfaces.

11. The clutch of claim 10 in which the means limiting the rocking of the cams comprises cam portions on each cam engageable with the reaction surfaces when each cam is in its operative position.

12. A clutch for a unit having a pair of concentric driven shafts and a driving element axially alined therewith, said clutch comprising a first member fast on said driving element, a second member, a plurality of means connecting said first and second members in spaced relation so that adjacent faces thereof constitute backing surfaces, a third member, a plurality of means connecting said second and third members in spaced relation so that adjacent faces thereof constitute reaction surfaces, a clamping member slidably supported by said first named connecting means, a plurality of cams, each of said second named means having a slot disposed in parallel with the axis of said shafts, a pin in each slot slidably and pivotally connecting said cams to said second named connecting means, arms carried by said clamping plate pivotally connected to each of said pins, clutch means slidably supported by each of said driven shafts between said backing surfaces and separated by said clamping member, and shifting mechanism, said mechanism comprising an axially movable member, and links pivotally connected to said last named member and to each of said cams to rock said cams into a position in which said clamping member clamps either of said clutch means against the adjacent backing surface.

13. The clutch of claim 12 in which the periphery of the clamping member is formed with a plurality of recesses defining spaced ears to which the arms are connected and the periphery of the second named member is formed with recesses in alinement with the ears to accommodate the arms.

JOHN T. BARRON.